(12) United States Patent
Lewin et al.

(10) Patent No.: US 6,680,940 B1
(45) Date of Patent: Jan. 20, 2004

(54) SYSTEM FOR TRANSPORTING ETHERNET FRAMES OVER VERY HIGH SPEED DIGITAL SUBSCRIBER LINES

(75) Inventors: Amit Lewin, Tel Aviv (IL); Yackov Sfadya, Kfar Saba (IL); Eytan Mann, Modiin (IL); Yuri Poddobny, Herzelia (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/315,215

(22) Filed: May 19, 1999

(51) Int. Cl.$^7$ ............................................. H04L 12/56
(52) U.S. Cl. .................... 370/389; 370/352; 370/356; 370/492
(58) Field of Search ..................... 370/389, 352–358, 370/397, 419, 440, 465, 466, 467, 469, 492, 493–494, 522

(56) References Cited

U.S. PATENT DOCUMENTS

| | | | |
|---|---|---|---|
| 5,410,343 A | 4/1995 | Coddington et al. ............. 348/7 |
| 5,778,189 A | 7/1998 | Kimura et al. .......... 395/200.66 |
| 5,784,683 A | 7/1998 | Sistanizadeh et al. ....... 370/487 |
| 5,790,548 A | 8/1998 | Sistanizadeh et al. ....... 370/401 |
| 5,812,786 A | 9/1998 | Seazholtz et al. ...... 395/200.63 |
| 5,905,781 A | * 5/1999 | McHale et al. .......... 379/93.14 |
| 5,909,564 A | * 6/1999 | Alexander et al. ........... 710/316 |
| 5,978,373 A | * 11/1999 | Hoff et al. .................... 370/392 |
| 5,991,308 A | 11/1999 | Fuhrmann et al. .......... 370/342 |
| 5,999,565 A | * 12/1999 | Locklear, Jr. et al. ....... 375/222 |
| 6,055,297 A | 4/2000 | Terry .............................. 379/1 |
| 6,084,881 A | * 7/2000 | Fosmark et al. ............. 370/397 |
| 6,088,368 A | 7/2000 | Rubinstain et al. .......... 370/480 |
| 6,101,182 A | 8/2000 | Sistanizadeh et al. ....... 370/352 |
| 6,104,749 A | 8/2000 | Lu et al. ...................... 375/222 |
| 6,157,635 A | 12/2000 | Wang et al. ................. 370/352 |

(List continued on next page.)

FOREIGN PATENT DOCUMENTS

EP          1206109 A1      5/2002      .......... H04M/11/06

OTHER PUBLICATIONS

Broadcom Product Brief, BCM5203 Overview, Broadcom Corporation, Irvine, CA (1998), 2 pages.
VDSL Draft Specification, ANSI T1E1.4 Subcommittee, American National Standards Institute, Huntsville, Alabama, Jun. 1998, 4 pages.
MPC 860 PowerQUICC© User's Manual, Chapter 24, Motorola Corp., Jul. 1998.
Technical Report TR–003, Framing and Encapsulation Standards for ADSL: Packet Mode, Jun. 1997, 17 pages.
RFC 1662,. PPP in HDLC–Like Framing, Jul. 1994, pp. 1–23.
Taylor, "Internetworking Handbook", 1998, McGraw Hill, Second Edition, p. 697.

*Primary Examiner*—Douglas Olms
*Assistant Examiner*—Van Kim T. Nguyen
(74) *Attorney, Agent, or Firm*—Howard Zaretsky

(57) ABSTRACT

An apparatus for and method of encapsulating Ethernet frames over a Very high speed Digital Subscriber Line (VDSL) transport facility. The VDSL frames are transmitted over a point to point VDSL link where they are subsequently extracted and forwarded as standard Ethernet frames. The VDSL facility transport system comprises an Ethernet to VDSL Customer Premises Equipment (CPE) coupled to a DSL Access Multiplexor (DSLAM) over a VDSL transport facility. The Ethernet to VDSL CPE functions to receive a 10 BaseT Ethernet signal and encapsulate the Ethernet frame into a VDSL frame for transmission over the VDSL facility. The DSLAM is adapted to receive VDSL frames, extract Ethernet frames therefrom and generate and output a standard Ethernet signal. Ethernet frames are encapsulated within VDSL frames and transmitted on the wire pair without regard to the state of the Tx and Rx SOC signals output by the VDSL transceiver.

25 Claims, 9 Drawing Sheets

U.S. PATENT DOCUMENTS

| | | | |
|---|---|---|---|
| 6,178,161 B1 | 1/2001 | Terry | 370/276 |
| 6,236,664 B1 * | 5/2001 | Erreygers | 370/492 |
| 6,286,049 B1 * | 9/2001 | Rajakarunanayake et al. | 709/227 |
| 6,339,613 B2 | 1/2002 | Terry | 370/201 |
| 6,351,487 B1 * | 2/2002 | Lu et al. | 375/225 |
| 6,374,288 B1 * | 4/2002 | Bhagavath et al. | 709/203 |
| 6,404,861 B1 * | 6/2002 | Cohen et al. | 379/93.01 |
| 6,424,657 B1 * | 7/2002 | Voit et al. | 370/412 |

* cited by examiner

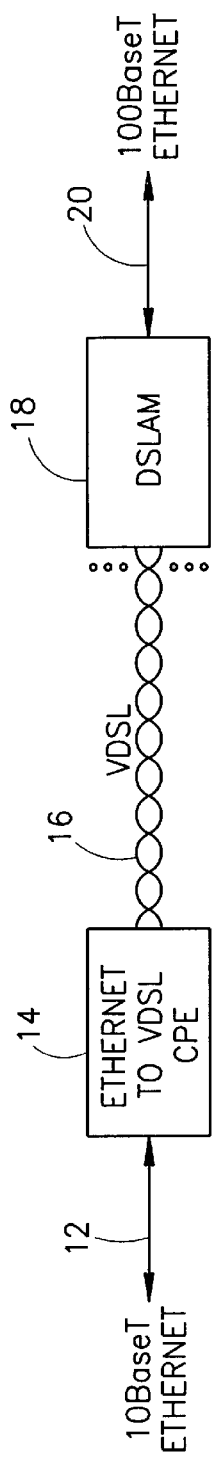
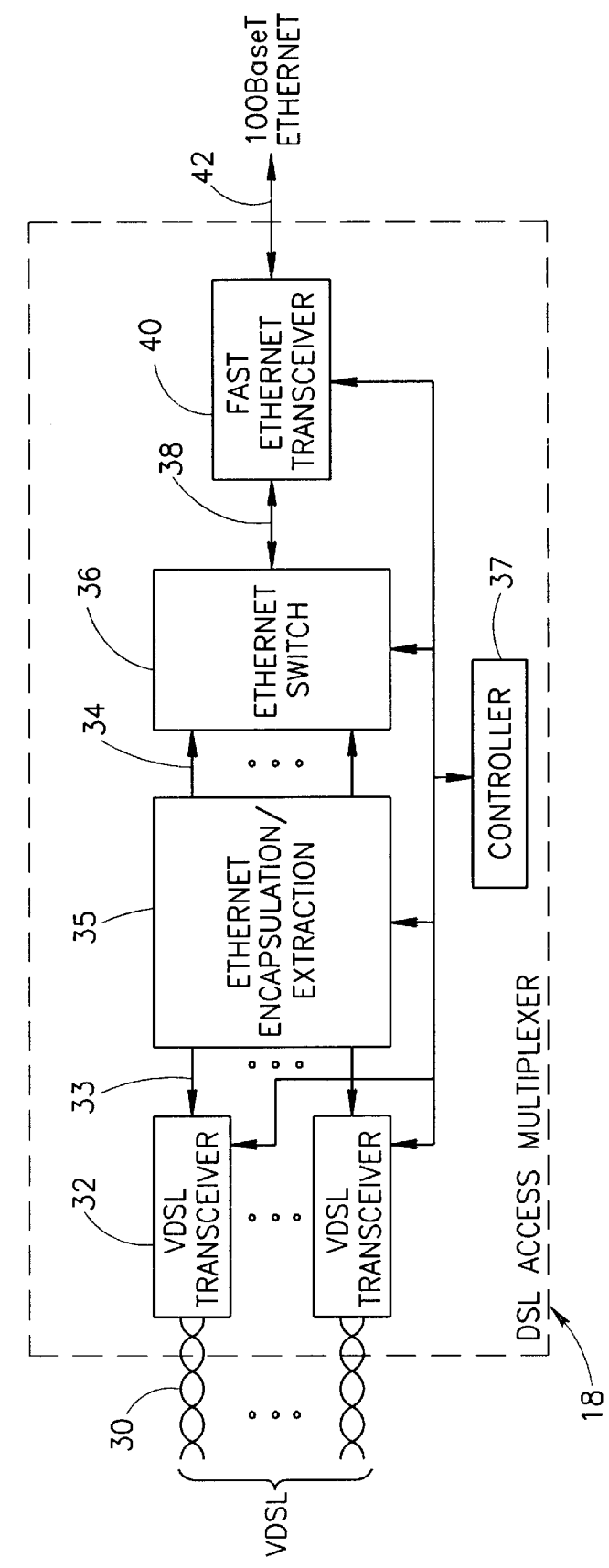

SYSTEM FOR TRANSPORTING ETHERNET FRAMES OVER VERY HIGH SPEED DIGITAL SUBSCRIBER LINES

FIELD OF THE INVENTION

The present invention relates generally to data communication systems and more particularly relates to a system for transporting Ethernet frames over Very high speed Digital Subscriber Lines (VDSL).

BACKGROUND OF THE INVENTION

There is a growing need among both individuals and enterprises for access to a commonly available, cost effective network that provides speedy, reliable services. There is high demand for a high-speed data network, one with enough bandwidth to enable complex two-way communications. Such an application is possible today if, for example, access is available to a university or a corporation with sufficient finances to build this type of network. But for the average home computer user or small business, access to high speed data networks is expensive or simply impossible. Telephone companies are therefore eager to deliver broadband services to meet this current explosion in demand.

One of the problems is that millions of personal computers have found their place in the home market. Today, PCs can be found in over 60% of all United States households, many of which have more than one computer networked together, and over 50% of United States teenagers own computers. Virtually every PC sold today is equipped with a modem, enabling communication with the outside world via commercial data networks and the Internet. Currently, people use their PCs to send and receive e-mail, to access online services, to participate in electronic commerce and to browse the Internet. The popularity of the Internet is such that there are over 100 million users around the globe. These figures indicate that in the past few years the personal computer has fueled a dramatic increase in data communications and the corresponding demands on the data networks that carry the traffic.

The Internet serves as a good example of the increased demands that have been placed on data networks. At first, Internet access consisted of text only data transfers. Recently, with the popularity of the World Wide Web (WWW) and the construction of numerous sites with high quality content, coupled with the development of Internet browsers such as Mosaic, Netscape Navigator and Microsoft Internet Explorer, the use of graphics, audio, video and text has surged on the Internet. While graphics, audio and video make for a much more interesting way to view information as opposed to plain text, bandwidth consumption is significantly higher. A simple background picture with accompanying text requires approximately 10 times the bandwidth needed by text alone. Real-time audio and streaming video typically need even more bandwidth. Because of the increased requirement for bandwidth, activities such as browsing home pages or downloading graphics, audio and video files can take a frustratingly long period of time. Considering that the multimedia rich World Wide Web accounts for more than one quarter of all Internet traffic, it is easy to see why the demand for bandwidth has outpaced the supply. In addition, the creative community is pushing the envelope by offering audio and full motion video on numerous sites to differentiate themselves from the millions of other sites competing for user hits.

As use of the Internet and online services continues to spread, so does the use of more complex applications, such as interactive video games, telecommuting, business to business communications and videoconferenceing. These complex applications place severe strains on data networks because of the intensive bandwidth required to deliver data-rich transmissions. For example, a telecommuter who requires computer aided design (CAD) software to be transported over the data network requires a high-bandwidth data pipeline because of the significant size of CAD files. Similarly, a business to business transaction in which large database files containing thousand of customer records are exchanged also consumes large amounts of bandwidth. The same is true for users seeking entertainment value from sites offering high quality video and audio. The lack of available bandwidth in today's data networks is the primary barrier preventing many applications from entering mainstream use. Just as processing power limited the effectiveness of early PCs, bandwidth constraints currently limit the capabilities of today's modem user.

Most computer modem users access data through the standard telephone network, known as plain old telephone service (POTS). Equipped with today's speediest modems, dial up modems on a POTS network can access data at a rate of 28.8, 33.6 or 56 Kbps. Dial up modem transmission rates have increased significantly over the last few years, but POTS throughput is ultimately limited to 64 Kbps. While this rate may be acceptable for some limited applications like e-mail, it is a serious bottleneck for more complex transactions, such as telecommuting, videoconferenceing or full-motion video viewing. To illustrate, full motion video compressed, using the Motion Picture Entertainment Group (MPEG)-2 standard requires a data stream of approximately 6 Mbps, or roughly 208 times the throughput of a 28.8 Kbps modem. Thus, using today's dial up modems, it would take more than 17 days to capture two hours of video. As bandwidth demands continue to grow, providers search for better ways to offer high speed data access. Further complicating the problem is the need to deliver all these complex services at an affordable price.

Today's most popular data access method is POTS. But as discussed previously, POTS is limited when it comes to large data transfers. An alternative to POTS currently available is Integrated Services Digital Network (ISDN). In the past few years, ISDN has gained momentum as a high-speed option to POTS. ISDN expands data throughput to 64 or 128 Kbps, both from the network to the home and from the home back to the network, and can be technically made available throughout much of the United States and in many other parts of the globe. Similar to POTS, ISDN is a dedicated service, meaning that the user has sole access to the line preventing other ISDN users from sharing the same bandwidth. ISDN is considered an affordable alternative, and in general, ISDN is a much better solution for applications such as Web browsing and basic telecommuting. However, like POTS, it severely limits applications such as telecommuting with CAD files and full-motion video viewing. The latter requires roughly 39 times the throughput than that provided by ISDN. Multichannel multipoint distribution service (MMDS), a terrestrial microwave wireless delivery system, and direct broadcast satellite (DBS), such as DirecTv and US Satellite Broadcasting (USSB), are wireless networks. They both deliver high bandwidth data steams to the home, referred to as downstream data, but neither has a return channel through which data is sent back over the network, referred to as upstream data. Although it is a relatively affordable system to deploy for broadcast applications, because it requires no cable wires to be laid, it falls short in interactive access. In order to use a wireless system for something as basic as e-mail, an alternate technology such as a telephone line must be used for the upstream communications.

Another network delivery system is asymmetric digital subscriber line (ADSL). Offering a downstream capacity of 6 Mbps or more to the home, ADSL has the downstream capacity to handle the most complex data transfers, such as full motion video, as well as an upstream capacity of at least 500 Kbps. However, due to its limitation of downstream bandwidth capacity, it essentially is a single service platform. Also, since it has to overcome the challenge of reusing several thousand feet of twisted pair wiring, the electronics required at each end of the cable are complex, and therefore currently very expensive.

Hybrid fiber coax (HFC), a network solution offered by telephone and cable companies, is yet another option for delivering high bandwidth to consumers known in the art. However, HFC has limitations. HFC networks provide a downstream capacity of approximately 30 Mbps, which can be shared by up to 500 users. Upstream bandwidth is approximately 5 Mbps and also is shared. A disadvantage with HFC is that shared bandwidth and limited upstream capacity become serious bottlenecks when hundreds of users are sending and receiving data on the network, with service increasingly impaired as each user tries to access the network.

It is a current trend among telephone companies around the world to include existing twisted pair copper loops in their next generation broadband access networks. Hybrid Fiber Coax (HFC), a shared access medium well suited to analog and digital broadcast, comes up short when utilized to carry voice telephony, interactive video and high speed data communications at the same time.

Fiber to the home (FTTH) is still prohibitively expensive in the marketplace that is soon to be driven by competition rather than costs. An alternative is a combination of fiber cables feeding neighborhood Optical Network Units (ONUs) and last leg premises connections by existing or new copper. This topology, which can be called fiber to the neighborhood (FTTN), encompasses fiber to the curb (FTTC) with short drops and fiber to the basement (FTTB), serving tall buildings with vertical drops.

One of the enabling technologies for FTTN is very high rate digital subscriber line (VDSL). VDSL is an emerging standard that is currently undergoing discussion in ANSI and ETSI committees. The system transmits high-speed data over short reaches of twisted pair copper telephone lines, with a range of speeds depending upon actual line length.

The VDSL standard as provided by the VDSL Draft Specification being drafted by the ANSI T1E1.4 Technical Subcommittee, provides guidelines for the transmitter and receiver within the VDSL modem. The connection between the VDSL modem and the CPE specifies a number of signals including TxData, RxData, RxErr, TxCLK, RxCLK and TxSOC and RxSOC. The latter two signals, i.e., TxSOC and RxSOC, provide an indication of the start of the VDSL frame to the CPE for both transmission and reception.

In accordance with the VDSL Draft Specification, it is intended that the Tx and Rx SOC signals be used by the CPE to synchronize the transmission and reception of the data to and from VDSL modem. In the case of transporting Ethernet data over the VDSL facility, a problem arises, however, when attempting to synchronize Ethernet frames to VDSL frames. The problem with using these Tx and Rx SOC signals is that the VDSL frame comprises a fixed number of bytes, e.g., 256 bytes, whereas the Ethernet frame may vary from 64 to 1518 bytes. Designing and implementing the circuitry, e.g., state machines, timing and framing circuits, etc., to perform the protocol matching, i.e., sync timing between Ethernet frames and VDSL frames is very complicated and hence expensive to implement.

It is desirable to have a means of transporting Ethernet frame data over a VDSL transport facility that does not require the complicated circuitry and state machines when utilizing the SOC signals provided by the VDSL modem.

SUMMARY OF THE INVENTION

The present invention is an apparatus for and method of encapsulating Ethernet frames over a Very high speed Digital Subscriber Line (VDSL) transport facility. The VDSL frames are transmitted over a point to point VDSL link where they are subsequently extracted and forwarded as standard Ethernet frames.

The VDSL facility transport system comprises an Ethernet to VDSL Customer Premises Equipment (CPE) to in communication with a DSL Access Multiplexor (DSLAM) over a VDSL transport facility. The DSLAM is typically located at the curb or before the 'last mile' in a subscriber loop. The Ethernet to VDSL CPE functions to receive a 10BaseT Ethernet signal and encapsulate the Ethernet frame into a VDSL frame for transmission over the VDSL facility. Likewise, the Ethernet to VDSL CPE also functions to receive a VDSL signal, extract Ethernet frames therefrom and output them as standard 10BaseT Ethernet signals.

The DSLAM is adapted to receive VDSL frames, extract Ethernet frames therefrom and generate and output a standard Ethernet signal. Likewise, the DSLAM is also adapted to receive standard Ethernet frames from an Ethernet input signal and encapsulate them in VDSL frames for transmission over the VDSL facility.

In accordance with the invention, the SOC signals provided by the VDSL are not utilized in transmitting the Ethernet frame data over the VDSL facility. Ethernet frames are encapsulated within VDSL frames and transmitted on the wire pair without regard to the state of the SOC signals. This overcomes the problems associated with synchronizing the transmission of the Ethernet data with the SOC signals.

Both the CPE and DSLAM comprise an Ethernet encapsulation/extraction (EEE) unit which functions to store and forward the Ethernet frames in both directions. The EEE unit comprises interface circuitry to couple the transmit and receive frame data to and from the VDSL channel.

The present invention also provides a method of providing the receiving station an indication of the start of a VDSL frame. A preamble having certain desirable characteristics such as good autocorrelation properties is used by the receiving station to identify the start of a VDSL frame. To further ensure that a detected start of frame is valid, the length field of the VDSL frame is examined.

The receiving station performs a check to determine whether the preamble pattern detected is actually a preamble or is Ethernet data within the payload of the VDSL frame. The length field contains 16 bits allowing for 65,536 combinations but only 1518−64=1454 of them are valid since the payload of the VDSL frame carries only Ethernet frame data which can only range from 64 to 1518 bytes. Thus, the length field is checked to further narrow the chance of a wrong synchronization.

There is therefore provided in accordance with the present invention an apparatus for encapsulating and extracting Ethernet frames to and from a Very high speed Digital Subscriber Line (VDSL) facility, including an Ethernet transceiver for receiving and transmitting Ethernet frames from and to an Ethernet source, an Ethernet encapsulation/ extraction (EEE) unit coupled to the Ethernet transceiver and operative to store Ethernet frames received therefrom for subsequent forwarding encapsulated within VDSL frames over the VDSL facility, the EEE unit operative to extract Ethernet frames received from the VDSL facility and subsequently store and them for forwarding to the Ethernet transceiver and the VDSL transceiver for receiving and transmitting VDSL frames from and to the VDSL facility.

The Ethernet encapsulation/extraction unit comprises Ethernet input circuitry coupled to the transmit portion of the Ethernet source and operative to convert the Tx serial input bitstream to a parallel stream of Tx bytes, Ethernet output circuitry coupled to the receive portion of the Ethernet source and operative to convert a parallel stream of Rx bytes into a Rx serial bitstream, VDSL output circuitry coupled to the transmit portion of the VDSL facility and operative to transfer VDSL frames ready for transmission to the VDSL transceiver, VDSL input circuitry coupled to the receive portion of the VDSL facility and operative to receive VDSL frames from the VDSL transceiver, a memory unit for storing data received from the Ethernet input circuitry and the VDSL input circuitry and a data processor coupled to the Ethernet input circuitry, Ethernet output circuitry, the VDSL output circuitry and the VDSL input circuitry, the data processor operative to store and forward data received via the Ethernet input circuitry to the VDSL output circuitry, the data processor operative to store and forward data received via the VDSL input circuitry to the Ethernet output circuitry.

The Ethernet transceiver comprises a 10BaseT Ethernet transceiver operative to communicate with a 10BaseT Ethernet source.

There is also provided in accordance with the present invention a Digital Subscriber Line Access Multiplexor (DSLAM) for encapsulating and extracting Ethernet frames to and from one or more Very high speed Digital Subscriber Line (VDSL) facilities, including a plurality of VDSL transceivers for receiving and transmitting VDSL frames from and to the VDSL facilities, an Ethernet transceiver for receiving and transmitting Ethernet frames from and to an Ethernet source, an Ethernet encapsulation/extraction (EEE) unit coupled to the plurality of VDSL transceivers and operative to extract Ethernet frames received from the VDSL facility and subsequently store and them for forwarding to the Ethernet transceiver, the EEE unit operative to store Ethernet frames received from the Ethernet source for subsequent forwarding encapsulated within VDSL frames over the VDSL facilities and an Ethernet switch operative to provide switching functions for one or more bidirectional Ethernet frame streams to and from of the EEE and the Ethernet transceiver.

The Ethernet transceiver comprises a 100BaseT Ethernet transceiver operative to communicate with a 100BaseT Ethernet source. The Ethernet switch comprises an Ethernet switch adapted to switch between a plurality of 10BaseT Ethernet channels and at least one 100BaseT Ethernet source.

There is further provided in accordance with the present invention, a method of encapsulating Ethernet frames onto a Very high speed Digital Subscriber Line (VDSL) facility, the method comprising the steps of receiving Ethernet frames from an Ethernet source, storing the Ethernet frames for subsequent forwarding, encapsulating the previously stored Ethernet frames within VDSL frames and transmitting the VDSL frames over the VDSL facility.

In addition, there is provided in accordance with the present invention, a method of extracting Ethernet frames from a Very high speed Digital Subscriber Line (VDSL) facility, the method comprising the steps of receiving VDSL frames from the VDSL facility, extracting Ethernet frames from the VDSL frames received, storing the Ethernet frames for subsequent forwarding and forwarding the Ethernet frames to an Ethernet source.

BRIEF DESCRIPTION OF THE DRAWINGS

The invention is herein described, by way of example only, with reference to the accompanying drawings, wherein:

FIG. 1 is a block diagram illustrating an Ethernet to VDSL CPE coupled to a DSLAM over a VDSL transport facility;

FIG. 2 is a block diagram illustrating the DSL Access Multiplexor (DSLAM) in more detail;

DETAILED DESCRIPTION OF THE INVENTION

Notation Used Throughout

Figure 3:
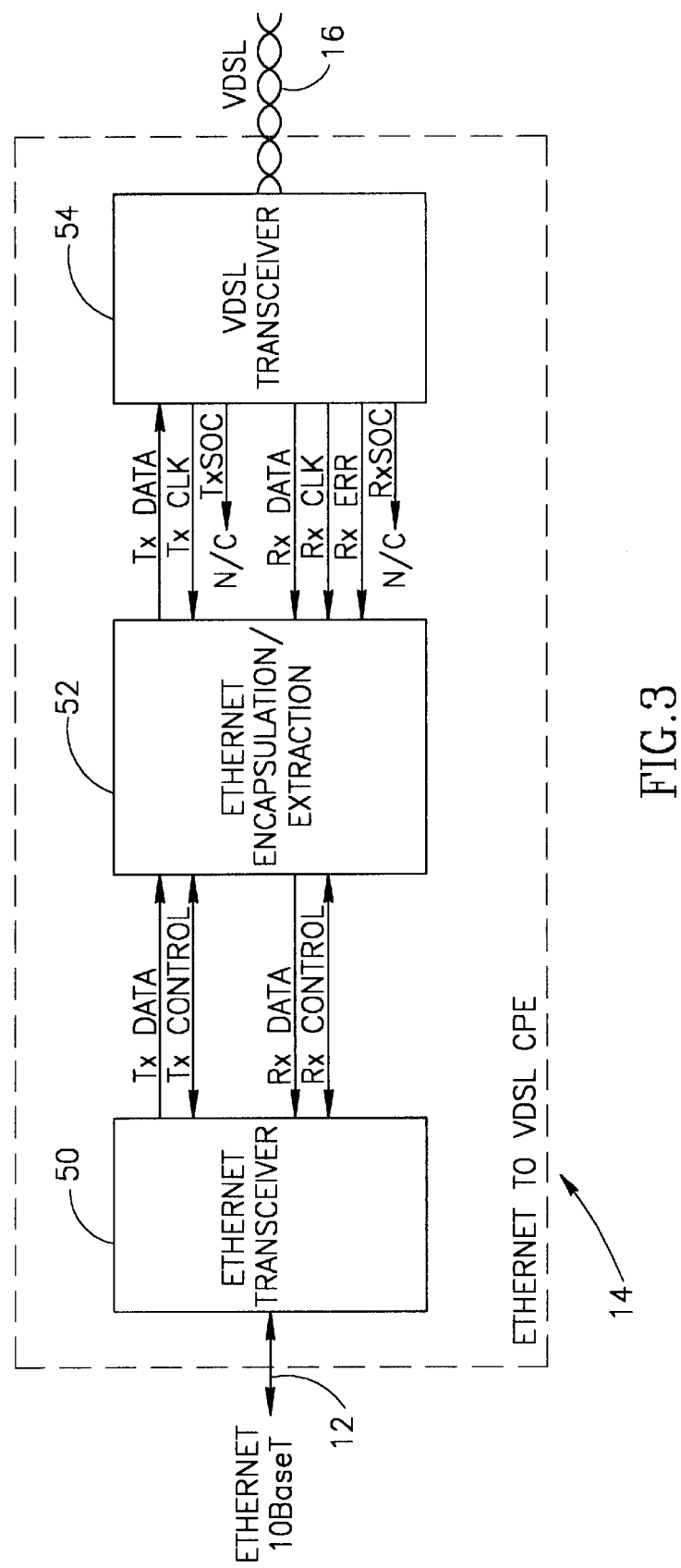
FIG. 3 is a block diagram illustrating the Ethernet to VDSL CPE in more detail.

The following notation is used throughout this document.

| Term | Definition |
|------|------------|
| ADSL | Asymmetric Digital Subscriber Line |
| ANSI | American National Standards Institute |
| CAD | Computer Aided Design |
| CAP | Carrierless Amplitude Modulation/Phase Modulation |
| CPE | Customer Premise Equipment |
| CRC | Cyclic Redundancy Check |
| DBS | Direct Broadcast Satellite |

-continued

| Term | Definition |
| --- | --- |
| DSL | Digital Subscriber Loop |
| DSLAM | Digital Subscriber Line Access Multiplexor |
| EDI | Ethernet Data in |
| EDO | Ethernet Data Out |
| EEE | Ethernet Encapsulation/Extraction |
| EI | Ethernet In |
| EO | Ethernet Out |
| EOF | End Of Frame |
| ETSI | European Telecommunications Standards Institute |
| FDM | Frequency Division Multiplexing |
| FEXT | Far End Crosstalk |
| FIFO | First In First Out |
| FTTB | Fiber to the Building |
| FTTC | Fiber to the Curb |
| FTTCab | Fiber to the Cabinet |
| FTTEx | Fiber to the Exchange |
| FTTH | Fiber to the Home |
| FTTN | Fiber to the Node |
| HFC | Hybrid Fiber Coax |
| IFG | Interframe Gap |
| ISDN | Integrated Services Digital Network |
| MMDS | Multichannel Multipoint Distribution Service |
| MPEG | Motion Picture Entertainment Group |
| NEXT | Near End Crosstalk |
| ONU | Optical Network Unit |
| PC | Personal Computer |
| POTS | Plain Old Telephone Service |
| QAM | Quadrature Amplitude Modulation |
| QoS | Quality of Service |
| RF | Radio Frequency |
| RFI | Radio Frequency Interference |
| SNMP | Simple Network Management Protocol |
| SOC | Start Of Cell |
| SOF | Start Of Frame |
| TIPI | Transport Independent Parallel In |
| TIPO | Transport Independent Parallel Out |
| USSB | US Satellite Broadcasting |
| UTP | Unshielded Twisted Pair |
| VDO | VDSL Data Out |
| VDSL | Very High Speed Digital Subscriber Line |
| WWW | World Wide Web |

General Description

The present invention is a system for transporting Ethernet frames over Very high speed Digital Subscriber Line (VDSL) frames. The VDSL frames are transmitted over a point to point VDSL link where they are subsequently extracted and forwarded as standard Ethernet frames. A block diagram illustrating an Ethernet over VDSL transport facility is shown in FIG. 1. The system, generally referenced 10, comprises an Ethernet to VDSL Customer Premises Equipment (CPE) 14 coupled to a DSL Access Multiplexor (DSLAM) 18 over a VDSL transport facility 16. The Ethernet to VDSL CPE 14 functions to receive a 10BaseT Ethernet signal 12 and encapsulate the Ethernet frame into a VDSL frame for transmission over the VDSL facility 16. Likewise, the Ethernet to VDSL CPE 14 also functions to receive a VDSL signal and extract Ethernet frames therefrom for output as standard 10BaseT Ethernet signals 12.

The DSLAM 18 is adapted to receive VDSL frames, extract Ethernet frames therefrom and generate and output a standard Ethernet signal. Likewise, the DSLAM 18 is also adapted to receive standard Ethernet frames from an Ethernet input signal 20 and encapsulate them in VDSL frames for transmission over the VDSL facility 16.

The VDSL facility 16 may comprise any suitable transport facility that is capable of transporting 10BaseT Ethernet data from one point to another. Preferably the VDSL facility conforms to the VDSL standard which is currently a draft specification being formulated by the ANSI T1E1.4 Technical Subcommittee.

A transport facility suitable for use with the present invention is the 10BaseS transport facility described in detail in U.S. application Ser. No. 08/866,831 filed May 30, 1997, now U.S. Pat. No. 6,088,368, entitled 'Ethernet Transport Facility Over Digital Subscriber Lines,' similarly assigned and incorporated herein by reference. A brief description of this transmission system is given below.

The 10BaseS transport facility is capable of transmitting 10 Mbps Ethernet over existing copper infrastructure. The system utilizes carrierless amplitude and phase modulation (CAP) which is a version of suppressed carrier quadrature amplitude modulation (QAM). QAM is the most commonly used form of high speed modulation over voice telephone lines. The system also utilizes frequency division multiplexing (FDM) to separate downstream channels from upstream channels. In addition, FDM is also used to separate both the downstream and the upstream channels from POTS and ISDN signals. A substantial distance in frequency is maintained between the lowest data channel and POTS frequencies to permit the use of very simple and cost effective POTS splitters, which are actually splitters/combiners. The upstream channel is placed above the downstream channel in frequency. The downstream and upstream data channels are separated in frequency from bands used for POTS and ISDN, enabling service providers to overlay 10BaseS on existing services.

The 10BaseS system combines copper access transmission technology of Ethernet based services with Quality of Service (QoS) guaranteed by the SRVP protocol and is capable of being fully managed through an SNMP agent. The 10BaseS transport facility can deliver symmetrical data at approximately 12 Mbps (net ~10 Mbps) over unshielded twisted pair (UTP) telephone wires originally intended for bandwidths of between 300 Hz and 3.4 KHz. QAM modulation and blind equalization are used to achieve a high transmission speed over existing copper infrastructure. In addition, the system is able to cope with several sources of noise such as impulse noise, e.g., POTS transients, radio frequency interference (RFI) noise and crosstalk noise, i.e., both near end crosstalk (NEXT) and far end crosstalk (FEXT). In terms of RF emissions, the system can operate using underground cabling as well as overhead distribution cabling.

The DSLAM 18 will now be described in more detail. A block diagram illustrating the DSL Access Multiplexor (DSLAM) in more detail is shown in FIG. 2. As described previously, the DSLAM 18 functions to encapsulate and extract Ethernet frames into and from VDSL frames. The DSLAM typically is adapted to generate a plurality of VDSL streams to be transmitted over a plurality of VDSL facilities 30 via one or more VDSL transceivers 32 at 30 the front end. The DSLAM comprises a high speed Ethernet port at the back end, an Ethernet switch 36, Ethernet encapsulation/ extraction circuitry 35 and a plurality of VDSL transceivers 32. The transceiver 40 functions to receive, for example, a 100BaseT Fast Ethernet signal 42 and provide bidirectional Fast Ethernet communications.

A controller 37 functions to control the operation of the VDSL transceivers 32, Ethernet encapsulation/extraction circuitry 35, Ethernet switch 36 and Fast Ethernet transceiver 40.

In the Ethernet to VDSL direction, Ethernet frames are received over the 100BaseT Fast Ethernet port 42 and are input to the Fast Ethernet transceiver 40. The Fast Ethernet signals are input to an Ethernet switch 36 capable of switching at Fast Ethernet speeds. The GT48212 Switched Ethernet Controller manufactured by Galileo Technology, San Jose, Calif. can be used to construct the Ethernet switch of the present invention. The switch 36 is coupled via signal lines 34 to circuitry 35 that performs Ethernet encapsulation and extraction. The Ethernet encapsulation/extraction circuitry 35 functions to encapsulate the Ethernet frame data from each of the channels output of the switch 36 into VDSL frames and forward them via signal lines 33 to the VDSL transceiver 32 corresponding to that particular channel. The VDSL transceivers 32 modulate the VDSL frame data and generate a VDSL signal suitable for transmission over the twisted wire pairs 30. Note that the VDSL frames may be transmitted using the 10BaseS transport facility described above.

In the VDSL to Ethernet direction, VDSL signals, e.g., 10BaseS signals, are received by one or more VDSL transceivers 32 over the twisted pair wires 30. A VDSL modem suitable for use in constructing the VDSL transceivers 32 of the present invention comprises the BCM6010 VDSL Transceiver manufactured by Broadcom, Irvine, Calif. or VDSL modems manufactured by Savan Communications Ltd., Kiryat Nordau, Israel.

Each VDSL transceiver 32 functions to demodulate the signal received over the twisted pair wires 30 and output VDSL frames via signal lines 33 to Ethernet encapsulation/extraction circuitry 35. The Ethernet encapsulation/extraction circuitry 35 functions to extract the Ethernet frame data encapsulated within the VDSL frame and generate standard Ethernet frames, which are then input via signal lines 34 to the Ethernet, switch 36. The switch forwards the Ethernet frames to the transceiver 40 for transmission over the 100BaseT port 42.

The Ethernet to VDSL CPE unit will now be described in more detail. A block diagram illustrating the Ethernet to VDSL CPE in more detail is shown in FIG. 3. The Ethernet to VDSL CPE unit 14 comprises an Ethernet transceiver 50, Ethernet encapsulation/extraction circuitry 52 and VDSL transceiver 54. The Ethernet transceiver 50 is adapted to receive and transmit standard 10BaseT Ethernet signals 12. An Ethernet transceiver suitable for use with the present invention comprises the LXT905 10BaseT Ethernet transceiver manufactured by Level One Communications, Inc., Sacramento, Calif. The LXT905 can be interfaced to a special purpose microprocessor such as the PowerQUICC MPC850 or MPC860 series of microprocessors manufactured by Motorola, Schaumburg, Ill. These microprocessors incorporate several serial communications controllers including a full Ethernet interface. Thus, the MPC850 can be used to read and write data from and to the LXT905 Ethernet transceiver.

The transceiver 50 communicates with the encapsulation/extraction circuitry 52 via signal lines that comprise Tx and Rx data lines and a plurality of Tx and Rx control lines. The Ethernet encapsulation/extraction circuitry 52 performs protocol conversion between Ethernet and VDSL frame formats. A VDSL modem suitable for use in constructing the VDSL transceiver 54 of the present invention comprises the BCM6010 VDSL Transceiver manufactured by Broadcom, Irvine, Calif. or VDSL modems manufactured by Savan Communications Ltd., Kiryat Nordau, Israel.

In the Ethernet to VDSL direction, Ethernet frames are received over the 10BaseT Ethernet port 12 and are input to the Ethernet transceiver 50. The Ethernet signals are input, via Tx and Rx data and control lines, to the Ethernet encapsulation/extraction circuitry 52 which functions to encapsulate the Ethernet frame data received over the Ethernet port 12 into VDSL frames. The VDSL frames are then forwarded to the VDSL transceiver 54. The VDSL transceiver 54 functions to modulate the VDSL frame data and generate a VDSL signal suitable for transmission over the twisted wire pair 16. Note that the VDSL frames may be transmitted using the 10BaseS transport facility described above.

In the VDSL to Ethernet direction, VDSL signals, which may comprise 10BaseS signals, are received by the VDSL transceiver 54 over the twisted pair wire 16. The VDSL transceiver 54 functions to demodulate the signal received over the twisted pair wire 16 and output VDSL frames to the Ethernet encapsulation/extraction circuitry 52. The Ethernet encapsulation/extraction circuitry 52 functions to extract the Ethernet frame data encapsulated within the VDSL frame and generate standard Ethernet frames which are then forwarded to the Ethernet transceiver 50 for transmission over the 10BaseT port 12.

The VDSL transceiver 54 functions to provide the clocking via TxCLK and RxCLK signals for both transmit and receive data signals TxData, RxData. In addition, the transceiver 54 provides a RxErr signal that is asserted when an error is detected in the received data. An error condition may comprise a framing error, loss of synchronization of the receive signal, etc. Further, the transceiver 54 provides a Tx and Rx Start of Cell (SOC) signal, TxSOC, RxSOC. The SOC signals, as defined in the VDSL draft standard, are suitable for use in transporting ATM cell data over VDSL but are suitable also for general use in synchronizing the TxData signal input to the transceiver and the RxData output of the transceiver. The Tx and Rx SOC signals provide a pulse at the beginning of the VDSL frame. A VDSL frame comprises a fixed number of bytes, e.g., 256, which has no relation to the number of bytes in an Ethernet frame.

As discussed previously in the Background Section of this document, the circuitry required is very complex to design to synchronize Ethernet frames to the VDSL frames in accordance with the SOC signals. The present invention overcomes this problem by sending and receiving Ethernet frame data over VDSL without utilizing the Tx or Rx SOC signals. This eliminates any problems associated with synchronizing the Ethernet data to the SOC data. Problems include, for example, breaking up the Ethernet frame data into multiple sections to fit within the smaller VDSL frames (when the Ethernet frame exceeds 256 bytes) and subsequently regenerating the Ethernet frame by assembling the multiple smaller sections.

Figure 4:
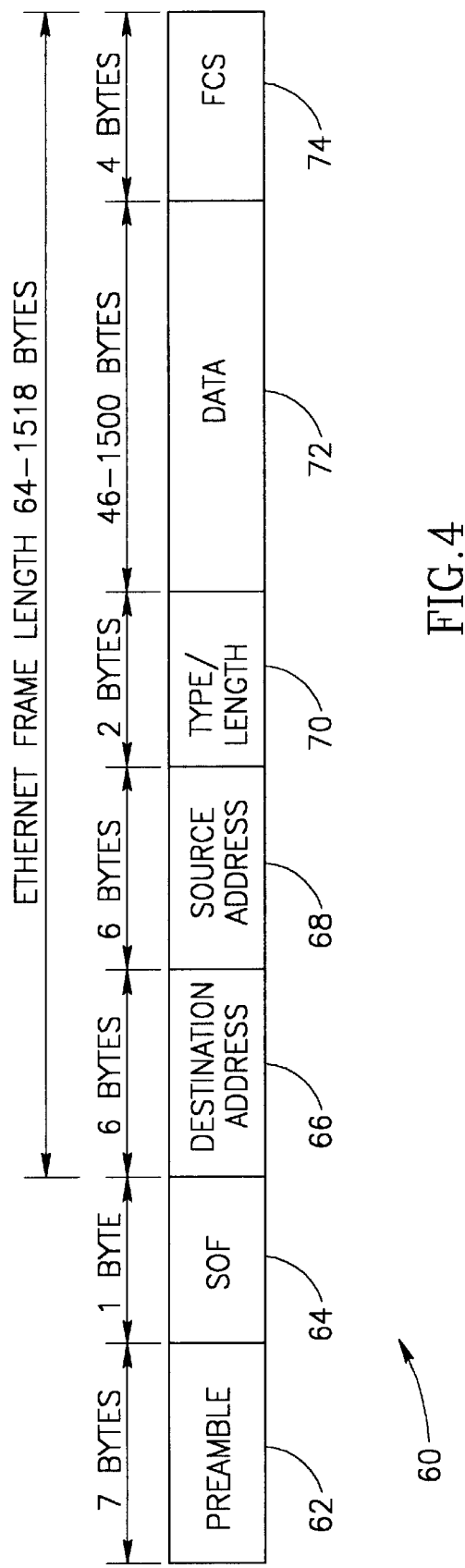
FIG. 4 is a diagram illustrating the format of a standard Ethernet frame.

A diagram illustrating the format of a standard Ethernet frame is shown in FIG. 4. A standard Ethernet frame, generally referenced 60, comprises a plurality of fields. The fields include a 7 byte preamble 62 consisting of 0xAA characters, a one byte Start of Frame (SOF) character 64 consisting of 0xAB, a 6 byte destination address 66, a 6 byte source address 68, 2 byte type/length 70, 46 to 1500 byte data field 72 and a 4 byte Frame Check Sequence 74 that comprises a CRC check. The type/length field 70 may comprise either type or length data, depending on the variant of Ethernet used. The fields comprising the destination address 66, source address 68, type/length 70, data 72 and FCS 74 are commonly referred to as the Ethernet frame. Note that the Ethernet frame may comprise from 64 to 1518 bytes depending on the size of the data field. Data shorter than 46 bytes is padded to a minimum of 46 bytes.

In accordance with the IEEE 802.3 standard, Ethernet data is transmitted using Manchester coding whereby an idle character is transmitted using DC and '0' and '1' characters are transmitted with a transition half way through the symbol, the transition for a '0' being opposite that for '1'.

Figure 5:
FIG. 5 is a diagram illustrating the interframe gap between to Ethernet frames.

A diagram illustrating the interframe gap between to Ethernet frames is shown in FIG. 5. The Ethernet IEEE 802.3 standard provides for a minimum Interframe Gap (IFG) of 9.6 microseconds between frames to facilitate collision detection and avoidance. The 9.6 microseconds IFG is equivalent to 12 bytes for 10 Mbps Ethernet. An example is shown whereby two Ethernet frames 80, 82 are separated by an IFG of 9.6 microseconds. The IFG is removed by the CPE 14 and is not transmitted over the VDSL facility. The IFG is inserted, however, when transmitting Ethernet frames constructed from VDSL frame data received over the VDSL facility.

Figure 6:
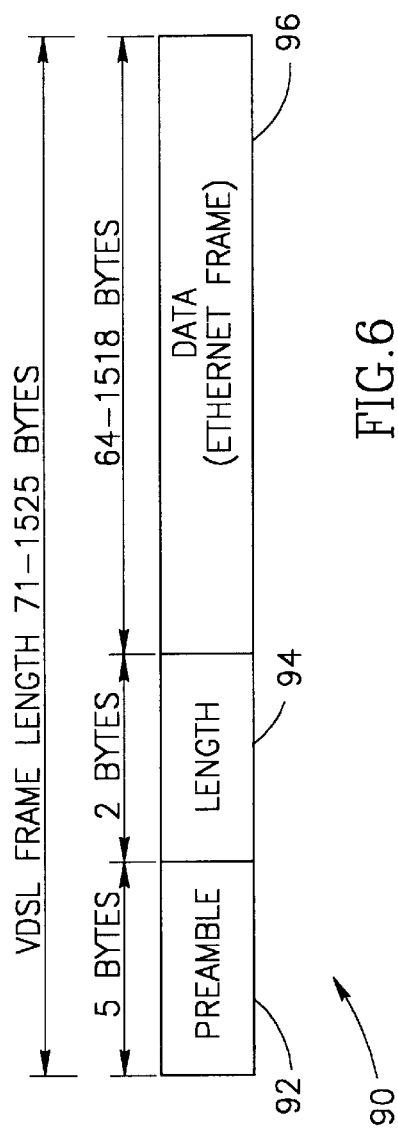
FIG. 6 is a diagram illustrating the format of VDSL frames that are transmitted over the VDSL facility.

A diagram illustrating the format of VDSL frames that are transmitted over the VDSL facility (or 10BaseS facility) is shown in FIG. 6. The VDSL frame, generally referenced 90, comprises a 5 byte preamble field 92, a 2 byte length field 94 and a data field 96. The preamble 92 comprises any suitable bit pattern, e.g., 0xAA, that facilitates reception, detection and synchronization of the VDSL signal at the receiver. Preferably, the preamble is chosen to have optimal autocorrelation properties, e.g., the class of codes known as Barker codes. The preamble field is used by the receiving station to identify a start of VDSL frame. Note that this field should not be confused with the 7 byte preamble field 62 (FIG. 4) of the Ethernet frame itself consisting of 0xAA characters.

The length field 94 conveys to the receiving station the number bytes in the data field that follows. The data field comprises the encapsulated Ethernet frame that may have a length of 64 to 1518 bytes (excluding the preamble and SOF fields). The entire VDSL frame 90 can have a length, including the preamble and length fields, ranging from 71 to 1525 bytes including all the Ethernet overhead data, e.g., preamble, SOF, destination address, source address, type/length and CRC. Note that if the IEEE 802.1 Q standard is to be supported, the frame may be 4 bytes longer.

It is important to note that in accordance with the present invention, as described previously, the VDSL frame is transmitted without the use of the Tx or Rx SOC signals provided by the VDSL transceiver. In place of the SOC signals, the preamble performs the role of providing a means for the receiver in the VDSL transceiver to know when a VDSL frame begins. The length field allows the receiver to know when the VDSL frame ends.

Figure 7:
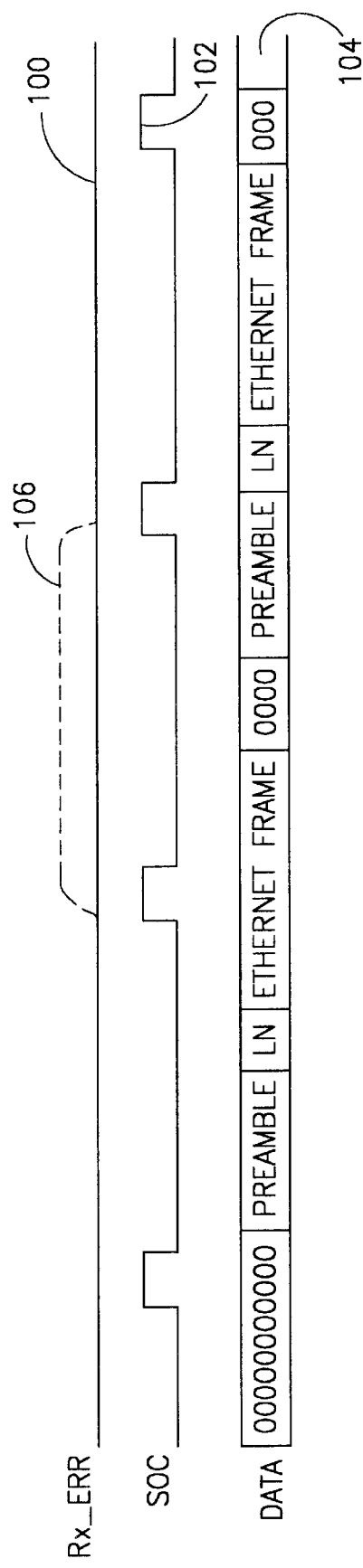
FIG. 7 is a timing diagram illustrating the relationship between the Rx_Err, SOC and VDSL data signals.

A timing diagram illustrating the relationship between the RxErr, SOC and VDSL data signals is shown in FIG. 7. As described previously, the RxErr signal (trace 100) is generated by the VDSL transceiver when sync is lost or any other error occurs in the receiver. The SOC signal (trace 102) is shown comprising a pulse to signal the start of the VDSL frame within the transceiver. The SOC signal, however, is not used by the apparatus of the invention. The data (trace 104) shown comprises a sequence of VDSL frames each consisting of a preamble, length and data fields with zeros inserted during idle times. As shown, the transmission of the data is completely independent from the SOC signal 102. As an example, a sync occurs as indicated by the dotted portion 106 of the Rx_Err trace 100. The data received during this time may contain one or more errors.

Figure 8:
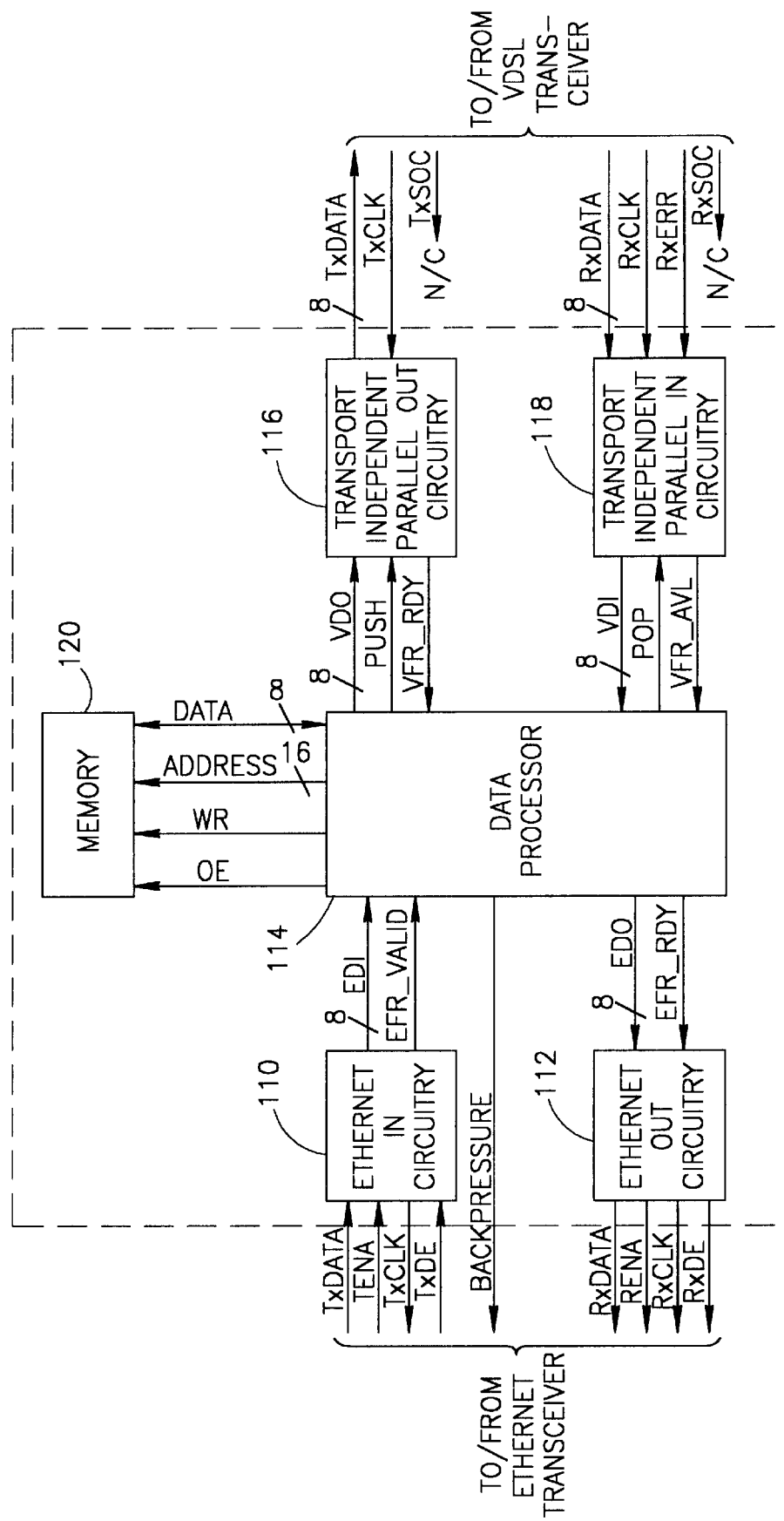
FIG. 8 is a block diagram illustrating the Ethernet encapsulation/extraction unit of the present invention in more detail.

The Ethernet encapsulation/extraction unit 52 will now be described in more detail. A block diagram illustrating the Ethernet encapsulation/extraction (EEE) unit of the present invention in more detail is shown in FIG. 8. Note that the EEE unit resides in both the CPE and the DSLAM, both of which are part of the Ethernet over VDSL transport facility of the present invention. They also form a major portion of the 10BaseS system, which the present invention may be used to construct as described hereinabove.

The EEE unit functions to provide an intermediary medium between an Ethernet channel and the VDSL front end. The functionality of the EEE unit in the CPE and the DSLAM are closely similar, therefore only an explanation for the EEE unit in the CPE will be given here. The description that follows, however, is also applicable to the EEE unit in the DSLAM.

The EEE unit 52 comprises several functional blocks of circuitry including Ethernet In (EI) circuitry 110, Ethernet Out (EO) circuitry 112, a data processor 114, memory unit 120, transport independent parallel out (TIPO) circuitry 116 and transport independent parallel in (TIPI) circuitry 118.

The EEE unit performs several functions including interfacing the data signals from the Ethernet transceiver 50 (FIG. 3). Note that the interface may comprise the seven wire Ethernet interface link provided by the Motorola MPC850 microprocessor. The EEE unit also interfaces to the VDSL transceiver that may comprise the Broadcom BCM6010 VDSL transceiver as described previously. In this case, the interface is via the Transport Independent Parallel Interface of the BCM6010. Control and management of the memory 120 so as to implement store and forward of Ethernet frames in the direction of both the VDSL transceiver and the Ethernet transceiver is also performed by the EEE unit.

The EEE unit is adapted to encapsulate Ethernet frames over the VDSL facility and to extract Ethernet frames from the VDSL facility. Note that it is also capable of resynchronizing in the event an uncorrectable error is received over the VDSL channel. The EEE unit also performs rate matching compensation in the event that the VDSL channel is slower than the Ethernet channel. The rate matching is achieved utilizing a backpressure output signal and applying it to the Ethernet transceiver.

The EEE unit is operative to receive serial Ethernet frames via the EI circuitry 110 which converts them to parallel format before they are transferred to the data processor for subsequent storage in a Tx buffer within memory 120. Once a complete frame is stored in the memory, the data processor initiates a frame transfer from the memory to the TIPO circuitry 116 that transmits the frame to the VDSL transceiver.

A similar process occurs in the opposite direction wherein VDSL data frames arrive at the TIPI circuitry 118. The frames are read in by the data processor 114 and stored in an Rx buffer within the memory 120. After a complete frame is stored in the memory, the data processor initiates a transfer of the frame to the EO circuitry 112 which functions to serialize the frame data and forward them towards the Ethernet transceiver.

The four interface circuitry blocks EI, EO, TIPO and TIPI comprise external interfaces but also need to read and write frames from and to the memory. The data processor 114 provides the interface to the memory 120 for the EI, EO, TIPO and TIPI circuitry blocks. The data processor arbitrates the access to the memory since it is the one that implements the interface therewith. Arbitration is achieved by implementing a 3 bit global counter in the data processor and by providing two time slots out of eight whereby each interface circuitry block, i.e., EI, EO, TIPO and TIPI, has access to the memory via the data processor. The EI circuitry has the first two time slots assigned thereto, EO circuitry the second two slots, TIPO circuitry the third two slots and TIPI circuitry the last two slots.

EI and EO Circuitry

The interface between the Ethernet transceiver and the EI circuitry 110 comprises the following signals. Note that the Motorola MPC850 may be used in the Ethernet transceiver and thus the following signals can interface to the MPC850. The TxData signal conveys the serial Ethernet bit stream from the Ethernet transceiver to the EEE unit. The TENA (Tx enable) indicates the validity of the TxData. When an Ethernet frame begins, this signal goes active until the end of the frame. The TxCLK is driven by the EEE unit for use by the transceiver to clock out the TxData. It typically is the 10 MHz clock used to drive a large portion of the EEE unit. A TxDE (device enable) signal is provided by the transceiver to enable the EI circuitry 110. A backpressure signal is asserted by the data processor and conveyed to the transceiver to indicate that one of the Ethernet input buffers is full and that the transceiver should not forward another frame until this buffer is emptied. The backpressure indication is conveyed to the Ethernet transceiver via one of the parallel I/O ports (assuming use of the MPC850 microprocessor). The MPC850, in response to receiving the backpressure indication, stores the received Ethernet frame in its internal memory until the signal is deactivated.

Similarly, the EO circuitry 112 interfaces with the Ethernet transceiver via the following signals. The RxData signal conveys the serial Ethernet bit stream from the EEE unit to the Ethernet transceiver. The RENA (Rx enable) indicates the validity of the RxData. When an Ethernet frame begins, this signal goes active until the end of the frame. The RxCLK is driven by the EEE unit for use by the transceiver to clock in the RxData. It typically is the 10 MHz clock used to drive a large portion of the EEE unit. A RxDE (device enable) signal is provided by the transceiver to enable the EO circuitry 112.

The serial Ethernet bitstream is clocked into the EEE unit via the EI circuitry 110 using the TxCLK which is a 10 MHz clock. The TENA signal indicates the validity of the bitstream, i.e., the start and end of the frame. The EI circuitry samples the valid bits and shifts them serially to perform a serial to 8 bit parallel conversion. When the eighth bit is shifted, an internal load signal is asserted to load the byte into another register that is read by the data processor when the global counter indicated an EI circuitry time slot, i.e., the first two slots 000 and 001. Note that the load signal and the global counter are not synchronous with each other and bear no correlation to each other. Frame data is transmitted to the data processor via an Ethernet Data In (EDI) bus that is eight bits wide and an Ethernet frame valid signal EFR_Valid. Regardless of when the load signal is asserted, data is transmitted only during slots 0 and 1 of the global counter.

When an Rx buffer in the memory is full and at least 9.6 microseconds have elapsed since the last outgoing frame, the EFR_RDY signal generated by the data processor is asserted. This signal is synchronized to the global counter reaching 2. When the EFR_RDY signal is asserted, the 8 bit EDO data bus conveys the contents of the frame byte by byte to the EO circuitry 112 which functions to sample the byte data at the global counter reaching 3. The EO circuitry converts the byte data from parallel to a serial bitstream and asserts the RENA signal output to the Ethernet transceiver during the entire frame time. The serial bitstream is conveyed to the Ethernet transceiver via the RxData signal line.

After the frame transmission is complete, the data processor deactivates EFR_RDY and subsequently the EO circuitry deactivates RENA as a result thereof At the other end of the EEE unit is an interface to the VDSL front end transceiver, which may comprise the Broadcom BCM6010 VDSL transceiver. The interface to the VDSL front end is implemented using a Transport Independent Parallel Interface as implemented by the Broadcom BCM6010 VDSL transceiver. The interface comprises both the transmit and receive channels of the BCM6010. The TIPO portion of the EEE unit transmits VDSL frames towards the VDSL transceiver while the TIPI portion receives VDSL frames from the VDSL transceiver.

Receiver Synchronization

The Ethernet frames entering the EEE unit 52 comprise a 'valid' indication associated with them. The valid indication may be either explicit as is the case with the TENA signal in the Ethernet transceiver interface or it may be implicit in the case of a Manchester encoded line wherein the signal does not alter its state when idle.

This information, i.e., valid or not valid, along with the payload itself is conveyed to the receiving station by the transmitting station via the VDSL frames. The method described herein to achieve the above is preferred in terms of simplicity and reliability.

The Ethernet frame is transmitted over the VDSL data channel a synchronously and without regard to the VDSL Tx_SOC or Rx_SOC signals, i.e., there is no correlation between the Ethernet frame and the SOC signals generated by the VDSL transceiver. Decoupling the Ethernet and VDSL frames provides simplicity whereby the task of fragmenting the Ethernet frame into multiple VDSL data frames is neither required nor performed. Hence, there is no need to reassemble the Ethernet frame from the VDSL frames at the receiving station. To maintain protocol robustness in the absence of start of frame sync pulses from the transceiver, the receiving station utilizes a synchronization method to find the start and end of an Ethernet frame. In the event synchronization is lost, this method is used by the receiving station to resynchronize without the lost of an excessive number of frames.

When the Ethernet channel is in the idle state and there are no valid Ethernet frames, the EEE unit transmits zero bytes, i.e., 0x00. These bytes precede each Ethernet frame and are used by the receiving station to identify the start of an Ethernet frame, as shown in FIG. 7.

The preamble, length and Ethernet frame payload portions of the VDSL frame have been described hereinabove. The synchronization method will now be described in more detail. As described above, the Ethernet frame data boundaries received from the 10BaseT port have no correlation with the VDSL frames transmitted over the VDSL facility. The Rx_Err indication at the receiving station, however, does relate to the VDSL data frames. If a VDSL frame is encountered that has errors, i.e., the Rx_Err signal is asserted, the frame can either be forwarded or dropped in accordance with an Rx_Err policy, which may be set by the user. If the policy is to drop frames, and the frame received contained non-idle Ethernet frame data, data will be lost. Note that theoretically, up to four Ethernet frames may reside within a single VDSL frame width, assuming 64 byte minimum size Ethernet frames and 256 byte VDSL frames (as specified by the VDSL Draft Standard).

In order to regain synchronization, the receiving station starts looking for the 5 byte pattern of the predefined preamble code. Note, however, that the Ethernet frame data encapsulated within the payload of the VDSL frame may contain the exact bit sequence of the preamble code pattern. This would result in the receiver regaining the wrong synchronization. The probability of this happening is given by Equation 1 below.

$$Pr(\text{preamble error}) = \left(\frac{1}{2}\right)^{40} \quad (1)$$
$$\approx 10^{-12}$$

In accordance with the present invention, the receiving station performs a check to determine whether the preamble pattern detected is actually a preamble or is Ethernet data within the payload of the VDSL frame. The length field contains 16 bits allowing for 65,536 combinations but only 1518−64=1454 of them is valid. Thus, the length field can be checked to further narrow the chance of a wrong sync.

First, the receiving station hunts for the preamble. If the preamble pattern is detected, the first two bytes following the preamble are read in which constitute the length field. Since the VDSL frame payload only carries Ethernet data, the value of the length field must be in the range of 64 to 1518 bytes. If the value of the length is less than 64 or more than 1518, then the preamble bit pattern detected was not a preamble indicating the start of a VDSL frame. The Rx_Err signal is asserted and a search of the preamble starts anew. If the length is legal, the remainder of the VDSL frame is read in.

Using this sync method further decreases the probability of obtaining the wrong sync by a factor given below.

$$Pr(\text{length error}) = (1518 - 64) \cdot \left(\frac{1}{2}\right)^{16} \quad (2)$$
$$\approx 0.022$$

Multiplying this Pr(length error) factor by the Pr(preamble error) yields an overall probability for wrong synchronization given by Equation 3 below.

$$Pr(\text{wrong sync}) = Pr(\text{preamble error}) \cdot Pr(\text{length error}) \quad (3)$$
$$= \left(\frac{1}{2}\right)^{40} \cdot 0.022$$
$$\approx 2.2 \times 10^{-14}$$

This results in a relatively low probability of wrong synchronization. Even in the event a non preamble is detected due to the bit pattern occurring in the payload of the VDSL frame, the upper layers of the protocol stack, i.e., the transport layer, will detect an error and cause a retransmission or other error recovery scheme.

TIPO Circuitry

The TIPO circuitry 116 will now be described in more detail. The TIPO circuitry provides an interface to the transmitter input of the VDSL transceiver, e.g., the Broadcom BCM6010 IC, and transfers to it Ethernet frame data read from the memory 120. The interface with the data processor comprises a VDSL frame ready signal VFRR_RDY which is asserted by the TIPO circuitry to indicate to the data processor that the FIFO in the TIPO circuitry is not full and that the data processor may send additional bytes. When the signal is not asserted, the transfer of byte data from the memory to the TIPO circuitry via the data processor is inhibited.

The interface with the data processor also comprises a PUSH signal which is used as a 'push' clock for the FIFO in the TIPO circuitry. The PUSH signal is derived from the 10 MHz clock within the data processor and is also a function of the VFR_RDY signal, the decrement frame counter within the data processor and whether there are any frames to transfer in the Tx buffer within the memory 120. VDSL frame bytes are transferred to the TIPO circuitry over an 8 bit VDO output bus. It is clocked using the 10 MHz clock from the data processor, i.e., the PUSH clock signal, and remains active with the data for eight clock cycles (approximately 800 ns). Note that the data on the VDO bus is valid only when the PUSH signal is asserted.

The TIPO circuitry also provides an interface to the VDSL transceiver. This interface comprises a TxData bus which is a byte wide data bus that transfers the VDSL frame data bytes to the VDSL transceiver. Data is transferred on the rising edge of the TxCLK signal provided by the transceiver. This clock signal may have different frequencies in accordance with the changing conditions of the line. The frequency is determined by the capacity of the transceiver to transport the frames onto the line which depends on line category, noise conditions, bridge taps, the amount of crosstalk, etc. The maximum speed of this clock signal is 10 MHz÷8=1.25 MHz.

Note that the TIPO circuitry is adapted to receive two clock signals: one provided by the data processor to clock in the bytes retrieved from the memory and one provided by the VDSL transceiver to clock the frame data out of the TIPO to the transceiver.

The TxCLK signal is driven by the VDSL transceiver. In order for the bytes to traverse from the 10 MHz clock of the data processor to the TxCLK domain, a byte wide FIFO is used. When the Tx buffer in the memory contains at least one complete Ethernet frame, the data processor transfers bytes to the TIPO circuitry over the VDO bus, which are then pushed into the FIFO in response to the PUSH signal output by the data processor. If the FIFO is not full, the VFD_RDY signal is asserted to indicate to the data processor that it may transmit another byte to the FIFO in the TIPO circuitry.

Note that the VFR_RDY signal is derived from the FIFO not full condition. This signal is synchronized to the clock of the data processor before being output from the TIPO circuitry. When the final byte of the frame can been transmitted, i.e., the FIFO is empty, the TIPO transmits idle bytes of 0x00 to the VDSL transceiver.

TIPI Circuitry

The TIPI circuitry 118 will now be described in more detail. The TIPI circuitry on the VDSL transceiver side functions to receive the VDSL data frames from the VDSL transceiver, i.e., the Broadcom BCM6010 IC, over the byte wide RxData input bus. The VDSL bytes are clocked into the TIPI by the RxCLK signal provided by the VDSL transceiver. An error indication signal Rx_Err provided by the VDSL transceiver is asserted for the duration of an entire VDSL frame length if an uncorrectable error in the data frame is detected. When such as event occurs, the TIPI circuitry sets an 'error in frame' flag that is conveyed to the data processor via interrupt means or status register means.

The interface from the TIPI circuitry to the data processor comprises a VDSL frame available VFR_AVL signal input to the data processor which indicates when the receive FIFO in the TIPI circuitry in not empty. This signal is synchronized to the data processor clock. The POP clock signal is provided by the data processor and used to transfer a byte of data from the receive FIFO in the TIPI circuitry to the data processor. Data is transferred to the data processor over an 8 bit wide VDI input data bus.

Note that here too, it is necessary to bridge the two clock domains, i.e., the RxCLK provided by the VDSL transceiver (having a maximum frequency of 10 MHz) and the POP signal provided by the data processor which is 10 MHz. In order to bridge these two clock domains, a byte wide receive FIFO is used in the TIPI circuitry. The RxCLK signal is used to push bytes into the FIFO while the POP signal asserted by the data processor is used to pop bytes out of the FIFO.

Data Processor

The data processor 114 portion of the EEE unit will now be described in more detail. The data processor functions to (1) allocate memory bandwidth resources among the four bitstreams generated by the four interface circuits, i.e., Ethernet frames in/out and VDSL frames in/out, (2) manage the various transmit and receive buffers in the memory 120, (3) interface to all four interface circuit blocks, i.e., EI, EO, TIPO and TIPI, so as to send and receive Ethernet and VDSL frames and (4) store and forward Ethernet frames in both directions.

The data processor is adapted to handle frames received from both the Ethernet channel and the VDSL channel. The upper limit of the aggregate rate of all four bitstreams is 40 Mbps made up of the combined four traffic streams of 10 Mbps each. To accomplish this task, the data processor comprises several state machines, wherein each is adapted to operate with a corresponding interface, i.e., EI, EO, TIPO, TIPI. All four state machines perform read and write operations from and to the memory and each operates within different time slots. As described previously, the EI circuitry is assigned slots 0 and 1; EO circuitry slots 2 and 3; TIPO circuitry slots 4 and 5; and TIPI circuitry slots 6 and 7.

The memory unit 120 is divided into two portions: a transmit portion and a receive portion. The transmit portion comprises two Tx buffers wherein each buffer holds an entire Ethernet frame. The frames are received from the Ethernet channel at a rate of 10 Mbps and destined to the VDSL transceiver at a maximum rate of 10 Mbps. When the first Ethernet frame is received, i.e., the Tx buffers were previously empty, the frame is placed in the first Tx buffer while the second Ethernet frame to arrive is stored in the second Tx buffer.

The receive portion comprises two Rx buffers wherein each buffer holds an entire Ethernet frame. The Ethernet frames are stored in the Rx buffer as they are received from the VDSL transceiver and are subsequently forwarded to the Ethernet transceiver. Two Rx buffers are sufficient as the ability to transfer data from the Rx buffers is greater than the ability of the TIPI circuitry to write data received from the VDSL transceiver into the Rx buffers due the faster speed of the Ethernet channel.

EI Circuitry to Data Processor State Machine

Figure 9:
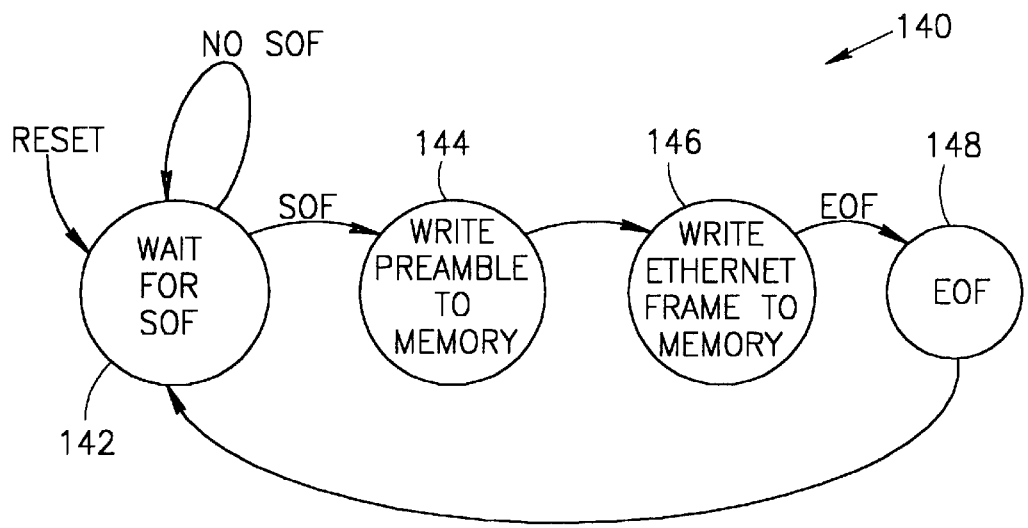
FIG. 9 is a state transition diagram illustrating the state machine implemented in transferring data from the Ethernet In circuitry to the data processor.

A state transition diagram illustrating the state machine implemented in transferring data from the Ethernet In circuitry to the data processor is shown in FIG. 9. The state machine, generally referenced 140, functions to transfer the incoming Ethernet frames from the EI circuitry to the memory. The data processor allocates a Tx buffer and controls the memory interface signals: data bus, address bus, WR and OE signals. Once a second frame is transferred to the memory, the data processor asserts the backpressure signal at least 1 microsecond prior to the end of the incoming frame. Since the frame length cannot be predicted, it is assumed to be the shortest possible, i.e., 64 bytes. Thus, when the byte count reaches 60, the backpressure signal is asserted.

The Wait for SOF state 142 is entered after a reset wherein the machine is initialized to this state. The machine continually idles in this state waiting for the indication of a start of frame before moving to the next state. When a start of frame (SOF) is detected, the machine enters the Write Preamble to Memory state 144 whereby 7 write accesses are performed to the Tx buffer in the memory. The first five bytes comprise the 5 byte long preamble code which is used by the recipient to detect the start of frame. The next two bytes written are dummy bytes that represent the length field of the VDSL frame being generated.

Which Tx buffer the incoming frame is written to depends on the status of the two buffers as indicated in the EI_buffer_status register, which can have the following values:

00—both buffers are empty, the incoming frame is written to the first buffer;

01—the first buffer is full, the incoming frame is written to the second buffer;

10—the second buffer is full, the incoming frame is written to the first buffer;

11—both buffers are full (backpressure is asserted), the incoming frame is not stored.

As the machine enters state 144, the Ethernet frame length counter is reset and the EI_buffer_status register is modified as shown in Table 1:

TABLE 1

EI buffer status register update

| Current Contents | Next Contents |
|---|---|
| 00 | 01 |
| 01 | 11 |
| 10 | 11 |
| 11 | N/A |

Once the seven access cycles are complete, the machine enters the Write Ethernet Frame to Memory state 146. In this state, the bytes received from the EI circuitry are stored in the memory. The Ethernet length counter is incremented on each access. If the length reached 60 bytes and the value of EI_buffer_status is either 01 or 10, the backpressure indication is asserted towards the Ethernet transceiver.

When the last byte of the frame is received and stored, as indicated by the deactivation of the EFR_VALID signal, i.e., End of Frame (EOF) has arrived, the machine enters the EOF state 148. In this state, the length field of the frame is read via the Ethernet length counter and used in generating a frame length for the VDSL frame being generated. The VDSL frame length is written to the two dummy bytes stored previously. The EI_buffer_status is updated wherein a flag is set to trigger the transfer of the buffer to the TIPO circuitry. Once the VDSL frame is complete, the machine returns to the Wait for SOF state 142.

Data Processor to TIPO Circuitry State Machine

Figure 10:
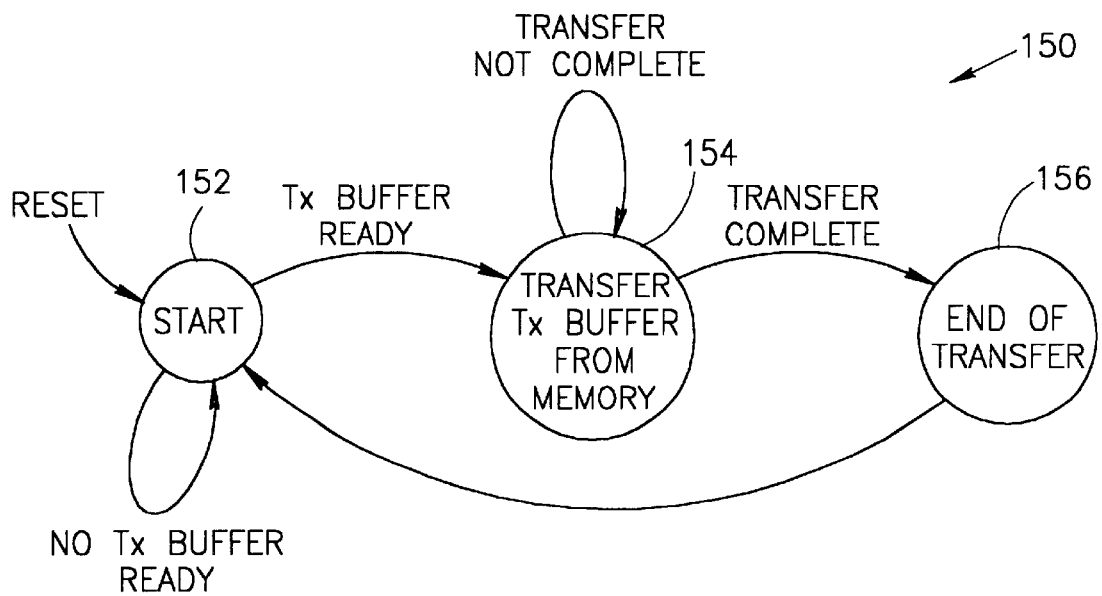
FIG. 10 is a state transition diagram illustrating the state machine implemented in transferring data from the data processor to the Transport Independent Parallel Out circuitry.

A state transition diagram illustrating the state machine implemented in transferring data from the data processor to the Transport Independent Parallel Out circuitry is shown in FIG. 10. This state machine, generally referenced 150, functions to transfer the Ethernet bytes previously stored in the Tx buffer in the memory to the TIPO circuitry for forwarding to the VDSL transceiver. A FIFO within the TIPO circuitry receives the bytes from the data processor. When this FIFO is full, the VFR_RDY signal is deactivated and the byte transfer process is suspended.

The machine enters the Start state 152 after a reset of after its has completed transferring an Ethernet frame from either of the two Tx buffers. The machine waits for one of the two Tx buffers to be filled, i.e., the flag in either EI_buffer_status register indicates the corresponding buffer is ready to be transferred, at which point, the next state Write Preamble to Memory 144 is entered. When this state is entered, the EI_buffer_status register is either a 01 or 10 indicating to the data processor which Tx buffer to transfer data from. A 01 indicates the first Tx buffer and a 10 indicates the second Tx buffer.

The bytes in the Tx buffer begin to be transferred. The frame length is determined from the sixth and seventh bytes. The length read is written into a frame_length counter. This counter is decremented on each non-idle access to the memory. When the counter reaches zero, the machine enters the next state, i.e., End of Transfer 156.

Note that the transfer process is only active while the VFR_RDY signal is active. This signal will typically not be active all the time, as the VDSL channel is slower than the Ethernet channel, thus causing the FIFO to fill up from time to time.

Once the transfer is complete and the last byte has been transferred from the memory, the End of Transfer state 156 is entered. In this state, the EI_buffer_status register is updated as follows in Table 2.

TABLE 2

EI buffer status register update

| Current Contents | Next Contents |
|---|---|
| 00 | N/A |
| 01 | 00 |
| 10 | 00 |
| 11 | 01 or 10 (depending on buffer transferred) |

Note that if the backpressure signal was active prior to this state, it is deactivated since the memory now has a free buffer again.

Figure 11:
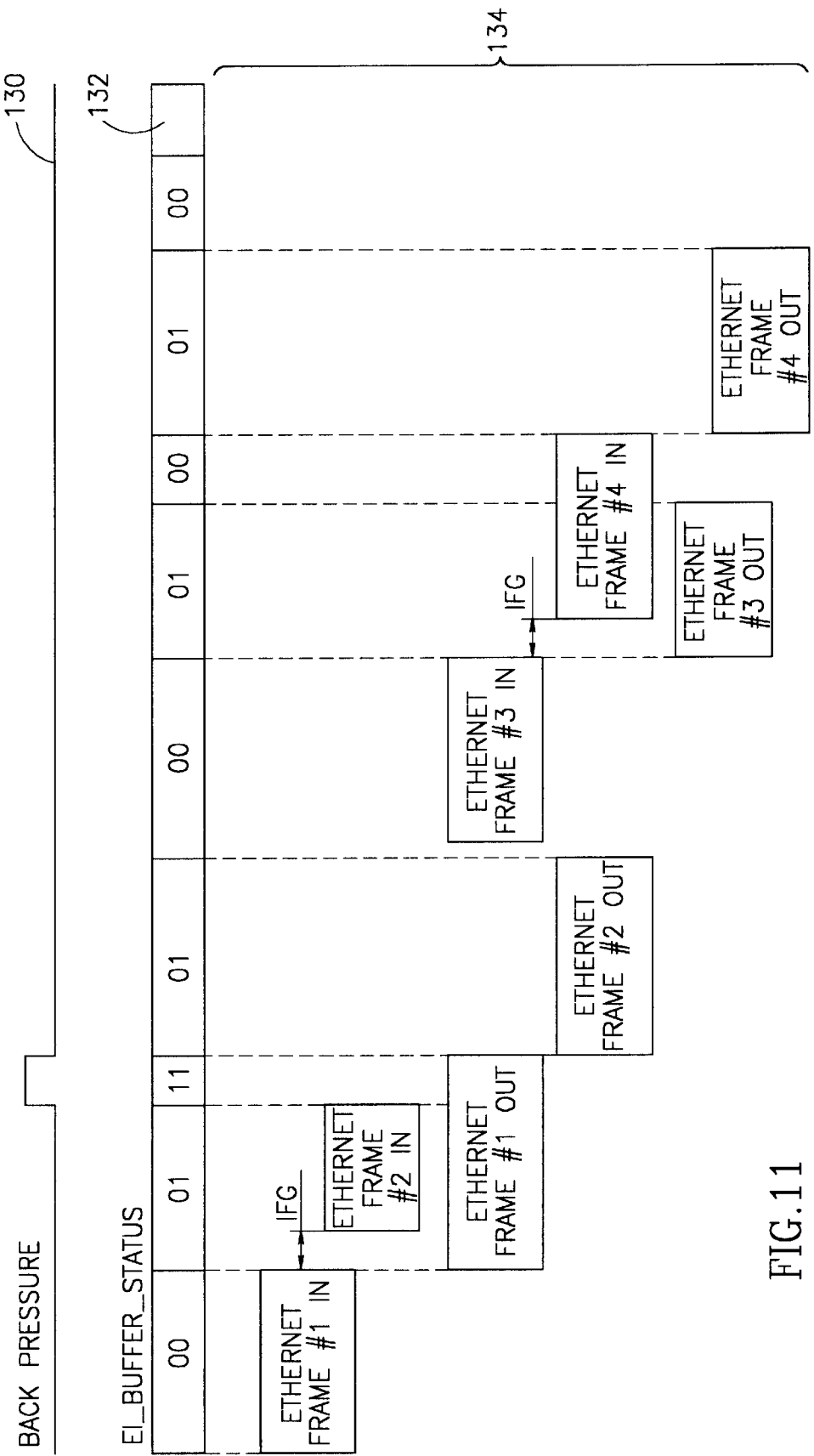
FIG. 11 is a diagram illustrating relationship over time of input to output Ethernet frames.

A diagram illustrating the relationship over time of input to output Ethernet frames and the EI_buffer_status register contents is shown in FIG. 11. The contents of the EI_buffer_status are shown in trace 132 along with the backpressure indication 130. A plurality of input and output Ethernet frames 134 is also shown. Note that only the inbound Ethernet frames are spaced apart by the Interframe Gap (IFG) of 9.6 microseconds while the outbound Ethernet frames have no IFG between them while being transmitted over the VDSL channel.

TIPI Circuitry to Data Processor State Machine

Figure 12:
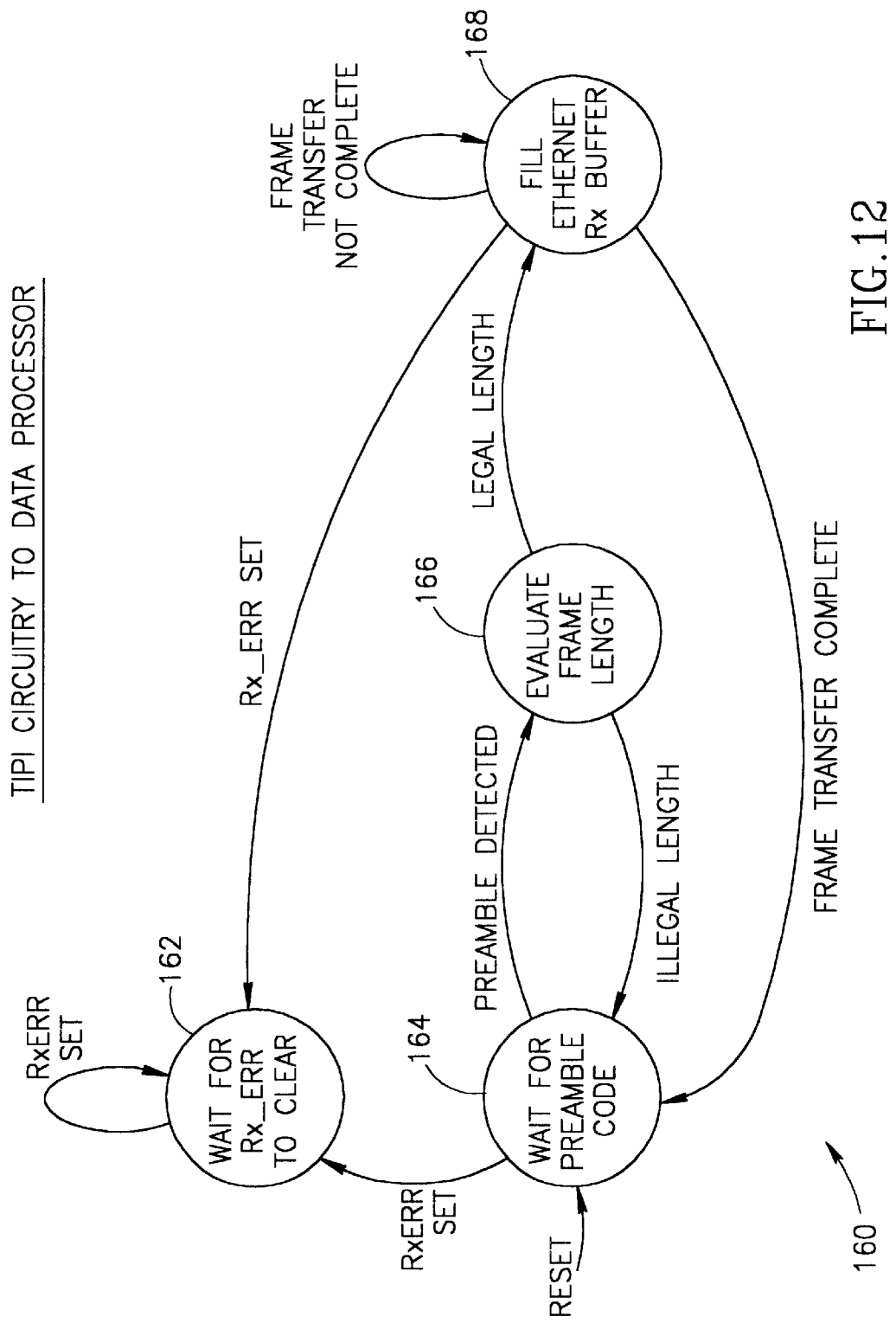
FIG. 12 is a state transition diagram illustrating the state machine implemented in transferring data from the Transport Independent Parallel In circuitry to the data processor.

A state transition diagram illustrating the state machine implemented in transferring data from the Transport Independent Parallel In circuitry to the data processor is shown in FIG. 12. This state machine, generally referenced 160, functions to control the process of extracting the Ethernet frames from the VDSL data stream. It receives bytes from the VDSL transceiver and searches for a predefined 5 byte preamble. When the preamble is detected, the machine begins sending bytes to the Rx buffer in the memory. Since the VDSL data channel is slower than the 10 Mbps rate of the Ethernet channel, it is expected that idle cycles will be received when the FIFO in the TIPI circuitry is empty.

When VDSL data frames arrive that have errors, the system can either forward the bytes with the errors toward the Ethernet channel or it can drop the frame and wait for the next error free frame. This decision is made in accordance with an error policy register (Rx_Err_Policy). If the VDSL frame is dropped, the EEE unit attempts to regain synchronization with the next Ethernet frame utilizing the sync method described above. The sync method functions to search for a preamble and, once found, evaluate the length field to verify the validity of the preamble.

A reset places the machine in the Wait for Preamble Code state 164 which hunts for the preamble code. If the Rx_Err signal is asserted, the Wait for Rx_Err to Clear state 162 is entered. Once the preamble code is detected, the frame length field is read and evaluated in the Evaluate Frame Length state 166. The contents of the frame length field are examined to check whether the length is out of the range of a valid Ethernet frame. If the length is not legal, i.e., the bit pattern was not a preamble but was data, the machine enters the Wait for Preamble Code state 164 again until another preamble code is detected. If the length is legal, the machine enters the Fill Ethernet Rx Buffer state 168. The frame_length counter is reset. If a Rx_Err signal is asserted, the Wait for Rx_Err to Clear state 162 is entered and the current frame is indicated as bad.

In the Fill Ethernet Rx Buffer state, the incoming Ethernet bytes are transferred to one of the Rx buffers. The frame_length counter is incremented. Note that the preamble is stripped off but the length is stored in the buffer. Bytes are transferred until the frame_length counter is equal to the frame length at which point the transfer is complete. Note that bytes are transferred only while the VFR_AVL signal is active. If during the transfer state 168, the Rx_Err signal is asserted, the Wait for Rx_Err to Clear state 162 is entered and the transfer ceases.

Data Processor to EO Circuitry State Machine

Figure 13:
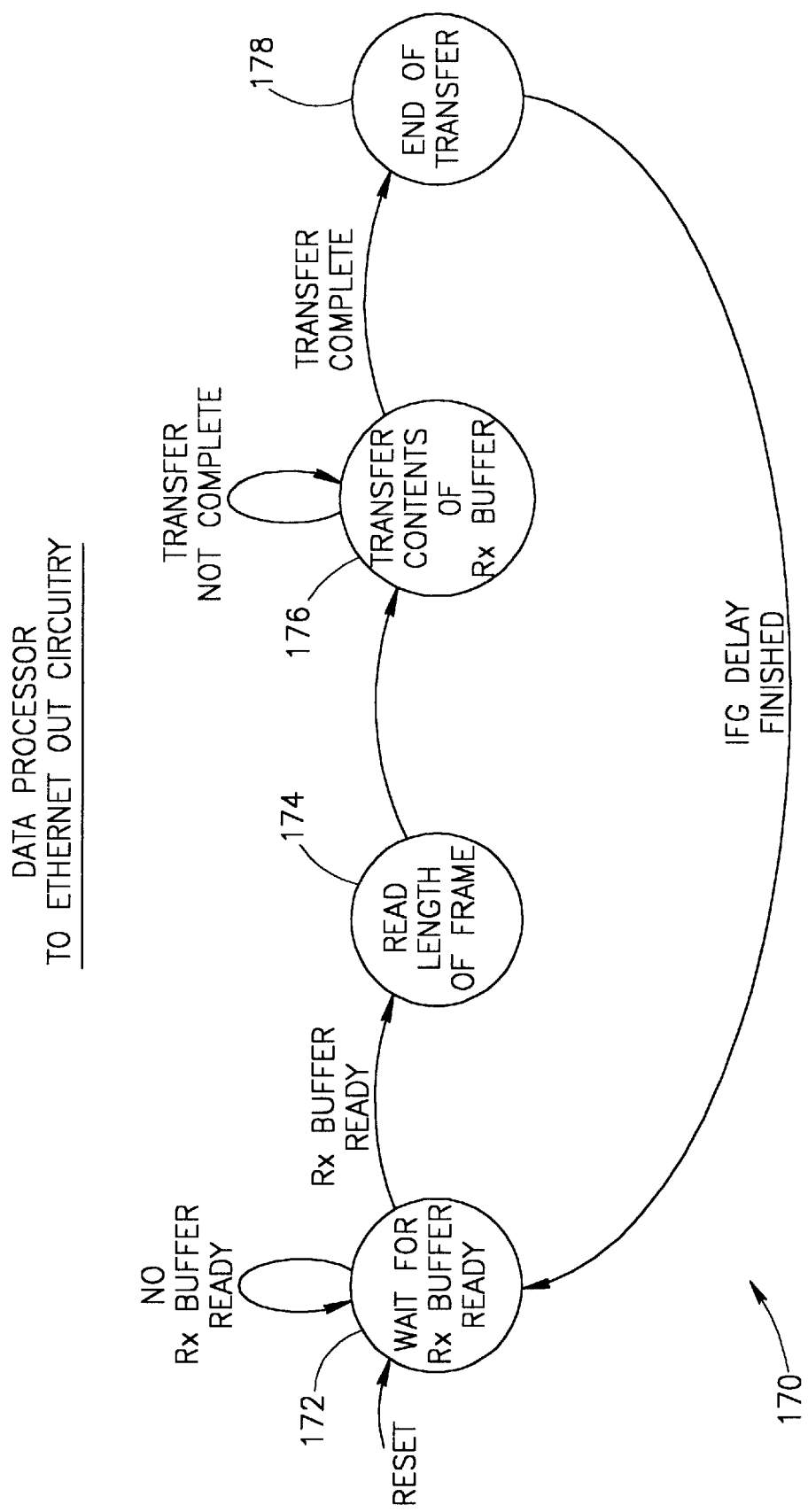
FIG. 13 is a state transition diagram illustrating the state machine implemented in transferring data from the data processor to the Ethernet Out circuitry.

A state transition diagram illustrating the state machine implemented in transferring data from the data processor to the Ethernet Out circuitry is shown in FIG. 13. This state machine, generally referenced 170, functions to control the memory accesses for transferring the Ethernet frame from an Rx buffer to the EO circuitry. When one of the Rx buffers has a complete Ethernet frame ready for forwarding, the machine reads in the length of the frame. Once the length is read in, the remainder of the frame is transferred. Note that the length read from the memory is not sent with the remainder of the frame, it is dropped after the transfer is complete.

A reset places the machine into the Wait for Rx Buffer Ready state 172. The machine idles until one of the Rx buffers contains a complete Ethernet frame indicated by a buffer_ready_status being non zero.

Once a buffer is ready, the Read Length of Frame state 174 is entered. The length constitutes the first two bytes written into the buffer. The length value is stored in a frame_length register and a frame_length counter is reset. The change to the next state Transfer Contents of Rx Buffer 176 is unconditional. The machine reads the bytes from the Rx buffer in the memory and increments the frame_length counter after each byte read. The frame_length counter is compared to the frame_length register that was written in the previous state. Once the frame_length counter reaches the value of the frame_length register, the machine enters the next state, i.e., the transfer is complete in the End of Transfer state 178, the machine idles for 9.6 microseconds to generate the Iterframe Gap (IFG) between two consecutive Ethernet frames. After idling, the Wait for Buffer Ready state 172 is entered and the bufer_ready_status is updated to take into account the newly freed Rx buffer.

While the invention has been described with respect to a limited number of embodiments, it will be appreciated that many variations, modifications and other applications of the invention may be made.

What is claimed is:

1. An apparatus for encapsulating and extracting Ethernet frames to and from a Very high speed Digital Subscriber Line (VDSL) facility, comprising:
    an Ethernet transceiver for receiving and transmitting Ethernet frames from and to an Ethernet source;
    a VDSL transceiver for receiving and transmitting VDSL frames from and to said VDSL facility; and
    an Ethernet encapsulation/extraction (EEE) unit coupled to said Ethernet transceiver and said VDSL transceiver, the EEE unit operative to:
        store Ethernet frames received from said Ethernet source by said Ethernet transceiver;
        encapsulate within VDSL frames Ethernet frames received from said Ethernet source for transmission over said DSL facility by said VDSL transceiver;
        extract Ethernet frames received from said VDSL facility by said VDSL transceiver; and
        store said Ethernet frames received from said VDSL facility for transmission to said Ethernet transceiver.

2. The apparatus according to claim 1, wherein said Ethernet encapsulation/extraction unit comprises:
    Ethernet input circuitry coupled to the receive portion of said Ethernet source and operative to convert the Tx serial input bitstream to a parallel stream of Tx bytes;
    Ethernet output circuitry coupled to the receive portion of said Ethernet source and operative to convert a parallel stream of Rx bytes into a Rx serial bitstream;
    VDSL output circuitry coupled to the transmit portion of said VDSL facility and operative to transfer VDSL frames ready for transmission to said VDSL transceiver;
    VDSL input circuitry coupled to the receive portion of said of said VDSL facility and operative to receive VDSL frames from said VDSL transceiver;
    a memory unit for storing data received from said Ethernet input circuitry and said VDSL input circuitry; and
    a data processor coupled to said Ethernet input circuitry, Ethernet output circuitry, said VDSL output circuitry and said VDSL input circuitry, said data processor operative to store and forward data received via said Ethernet input circuitry to said VDSL output circuitry, said data processor operative to store and forward data received via said VDSL input circuitry to said Ethernet output circuitry.

3. The apparatus according to claim 1, wherein said Ethernet transceiver comprises a 10BaseT Ethernet transceiver operative to communicate with a 10BaseT Ethernet source.

4. A Digital Subscriber Line Access Multiplexor (DSLAM) for encapsulating and extracting Ethernet frames to and from one or more Very high speed Digital Subscriber Line (VDSL) facilities, comprising:
    a plurality of VDSL transceivers for receiving and transmitting VDSL frames tom and to said VDSL facilities;
    an Ethernet transceiver for receiving and transmitting Ethernet frames from and to an Ethernet source;
    an Ethernet encapsulation/extraction (EEE) unit coupled to said plurality of VDSL transceivers and operative to:
        extract Ethernet frames from said VDSL frames received from said VDSL facility;
        store said Ethernet frames for transmission to said Ethernet transceiver;
        store Ethernet frames received from said Ethernet source for subsequent encapsulation within VDSL frames for transmission over said VDSL facilities; and
    an Ethernet switch operative to provide switching functions for one or more bidirectional Ethernet frame streams to and from of said EEE and said Ethernet transceiver.

5. The apparatus according to claim 4, wherein said Ethernet encapsulation/extraction unit comprises:
    Ethernet input circuitry coupled to the transmit portion of said Ethernet source and operative to convert a plurality of Tx serial input bitstreams to a plurality of parallel streams of Tx bytes;
    Ethernet output circuitry coupled to the receive portion of said Ethernet source and operative to convert a plurality of parallel streams of Rx bytes into a plurality of Rx serial bitstreams;
    VDSL output circuitry coupled to the transmit portion of each VDSL facility and operative to transfer VDSL frames ready for transmission to said VDSL transceivers;
    VDSL input circuitry coupled to the receive portion of each VDSL facility and operative to receive VDSL frames from said VDSL transceivers;
    a memory unit for storing data received from said Ethernet input circuitry and said VDSL input circuitry; and
    a data processor coupled to said Ethernet input circuitry, Ethernet output circuitry, said VDSL output circuitry and said VDSL input circuitry said data processor operative to store and forward data received via said Ethernet input circuitry to said VDSL output circuitry, said data processor operative to store and forward data received via said VDSL input circuitry to said Ethernet output circuitry.

6. The apparatus according to claim 4, wherein said Ethernet transceiver comprises a 100BaseT Ethernet transceiver operative to communicate with a 100BaseT Ethernet source.

7. The apparatus according to claim 4, wherein said Ethernet switch comprises an Ethernet switch adapted to switch between a plurality of 10BaseT Ethernet channels and at least one 100BaseT Ethernet source.

8. The apparatus according to claim 1, wherein VDSL frames are transmitted over Said VDSL facility without regard to Rx and Tx Start of Cell (SOC) signals provided by said VDSL transceiver.

9. The apparatus according to claim 1, wherein a preamble is utilized to detect the start of VDSL frames.

10. The apparatus according to claim 1, wherein a length field transmitted in said VDSL frames is utilized in determining the end of VDSL frames.

11. The apparatus according to claim 1, wherein said EEE unit comprises means for re-synchronizing after an error is detected in a received VDSL fame.

12. The apparatus according to claim 1, wherein said EEE unit comprises means for performing rate matching between VDSL and Ethernet streams utilizing a backpressure signal output to said Ethernet transceiver.

13. The apparatus according to claim 1, said EEE unit comprises means for transmitting zero bytes when said Ethernet source is in an idle state, said transmission of zero bytes enabling a receiver to detect a start of Ethernet frame.

14. The DSLAM according to claim 4, wherein VDSL frames are transmitted over said VDSL facility without regard to Rx and Tx Start of Cell (SOC) signals provided by said VDSL transceiver.

15. The DSLAM according to claim 4, wherein a preamble is utilized to detect the start of VDSL frames.

16. The DSLAM according to claim 4, wherein a length field transmitted in said VDSL frames is utilized in determining the end of VDSL frames.

17. The DSLAM according to claim 4, wherein said EEE unit comprises means for re-synchronizing after an error is detected in a received VDSL frame.

18. The DSLAM according to claim 4, wherein said EEE unit comprises means for performing rate matching between VDSL and Ethernet streams utilizing a backpressure signal output to said Ethernet transceiver.

19. The DSLAM according to claim 4, said EEE unit comprises means for transmitting zero bytes when said Ethernet source is in an idle state, said transmission of zero bytes enabling a receiver to detect a start of Ethernet frame.

20. The method according to claim 1, wherein VDSL frames are transmitted over said VDSL facility without regard to Rx and Tx Start of Cell (SOC) signals provided by said VDSL transceiver.

21. The method according to claim 1, further comprising the step of transmitting zero bytes when said Ethernet source is in an idle state, said transmission of zero bytes enabling a receiver to detect a start of Ethernet frame.

22. The method according to claim 1, further comprising the step of performing rate matching between VDSL and Ethernet steams utilizing a backpressure signal output to an Ethernet transceiver.

23. The method according to claim 14, wherein a preamble is utilized to detect the start of VDSL frames.

24. The method according to claim 14, wherein a length field transmitted in said VDSL frames is utilized in determining the end of VDSL frames.

25. The method according to claim 14, wherein said step of receiving comprises the step of re-synchronizing after an error is detected in a received VDSL frame.

\* \* \* \* \*